Figure 1:
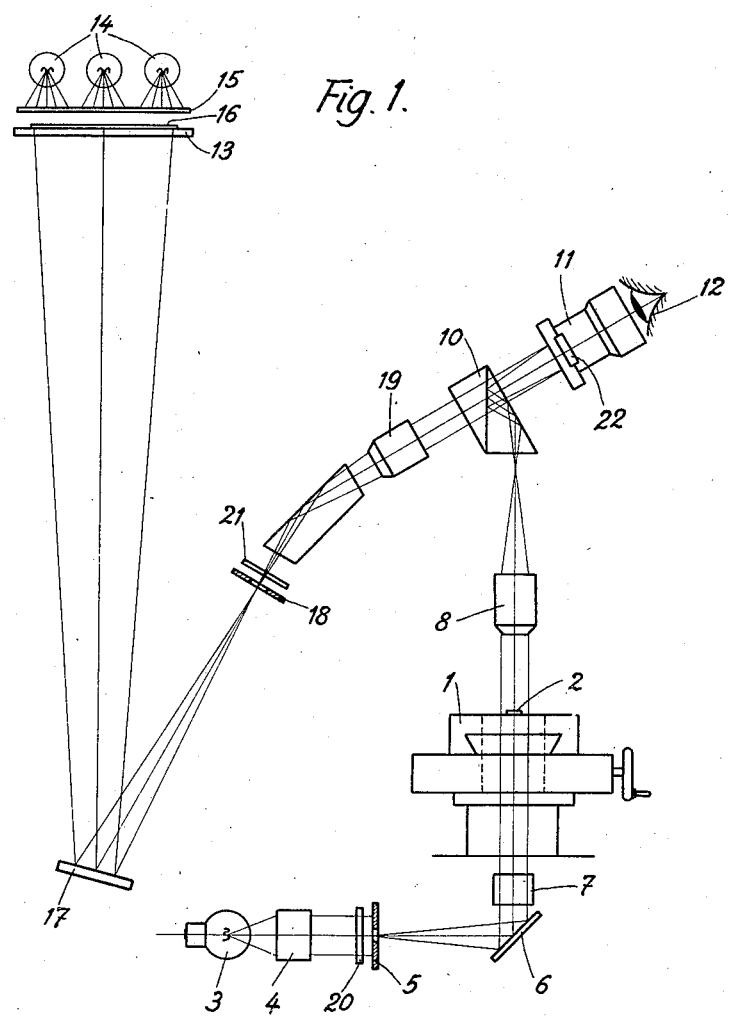

July 1, 1947. K. BUTSCHER 2,423,370
IMAGE PROJECTING COMPARISON MICROSCOPE
Filed June 30, 1942 2 Sheets-Sheet 1

Inventor
Karl Butscher
By Glascock Downing + Seebold
Attys.

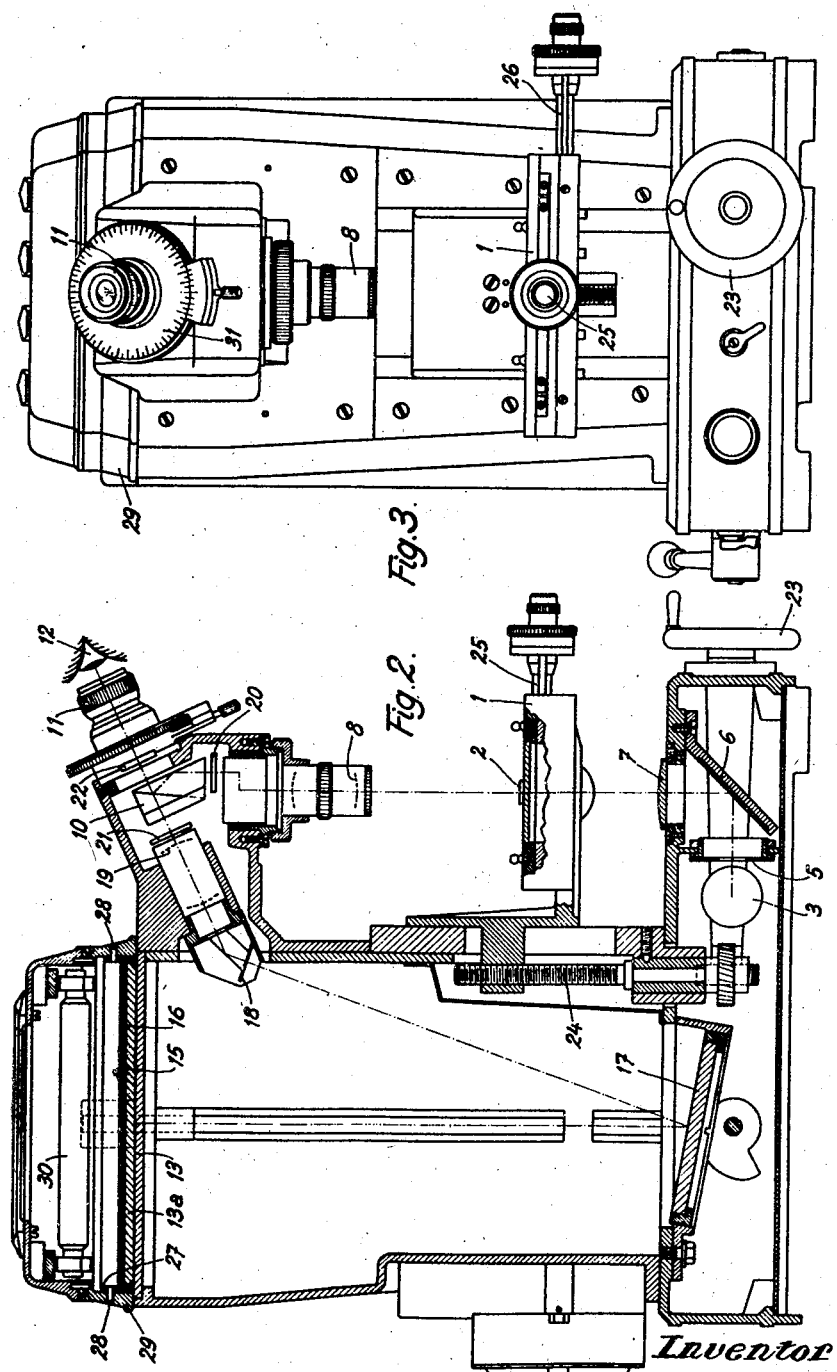

Patented July 1, 1947

2,423,370

UNITED STATES PATENT OFFICE 2,423,370

IMAGE PROJECTING COMPARISON MICROSCOPE

Karl Butscher, Bienne, Switzerland, assignor, by mesne assignments, to A.-G. Für Mechanisch-Optische Erfindungen, Chur, Switzerland, a joint-stock company of Switzerland Application June 30, 1942, Serial No. 449,125
In Switzerland July 15, 1941

5 Claims. (Cl. 88—14)

Object of the present invention is a measuring microscope, specially but not exclusively with a plane table, of the kind preferably used for measuring and testing calibres, tools and other mechanical parts and known by those skilled in the art under the name of "profile measuring microscope."

There are already measuring microscopes with movable or stationary lined glass plates inserted between objective and eyepiece and comparison microscopes which, by means of an intermediate optical system project a scale, a profile plate or an original piece, agreeing in scale with the piece to be tested, on to the object plane of the microscope system. Lined plates can only be made and mounted by specialists; this, however, puts the user to considerable expense and loss of time. The same is to be said for a comparative measure for which either a lined plate agreeing in scale with the original piece or an original piece is necessary; here to, difficulties arise for the user as it is practically impossible for him to make such small drawings as the lined plates used hitherto, especially if high accuracy is required.

The present invention remedies these inconveniences. The microscope according to the invention is characterised in that it is combined with an optical projection device allowing the image of an enlarged comparison means to be viewed simultaneously with the image of the object to be tested.

The enlarged comparison means may be an enlarged drawing (a so-called reference drawing), an enlarged scale, an enlarged rule, an enlarged model, etc. Lined glass plates or profile plates are thus no longer needed. In most cases an enlarged drawing is used. This drawing can be made at any time and without difficulty in any technical office on a suitable transparent material. The magnification of the microscope is chosen according to the size of the object to be tested, e. g. 10, 20, 30 fold, etc. The reference drawing is then preferably made on the scale of the magnification used, for instance, on the scale 10:1, 20:1, 30:1, etc. This allows of a very exact preparation of the reference drawing.

As the comparison means can be inserted by the user into and removed from the apparatus at will, the same apparatus may be used for the most various profiles and magnifications. Expense and loss of time for the manufacture and mounting of lined and profile plates are thus avoided.

The accompanying drawings illustrate, by way of examples, in

Fig. 1 a scheme of an embodiment

Fig. 2 a longitudinal section of another embodiment of the microscope and

Fig. 3 a view from the right in Fig. 2.

The microscope itself has an object carrier 1 formed as a movable plane table or measuring table vertically adjustable by means of a hand wheel 23 and a spindle 24 and provided with well-known measuring spindles 25 and 26 crossing each other, the object 2 to be tested resting on this table. The diascopic illumination is obtained by a light source 3 whose rays go through the condenser 4 (Fig. 1) and through an adjustable diaphragm 5 and fall upon the mirror 6 deviating them towards the collimator objective 7 which they leave in a parallel state in order, afterwards, to illuminate the object 2 to be tested. (In the embodiment according to Figs. 2 and 3 the condenser 4 is lacking.) From here, the rays reach the microscope-objective 8, are deviated in the prism or mirror system 10, and go through the eyepiece 11 into the eye 12.

The projection device combined with the microscope has a glass plate 13 upon which the enlarged comparison means, e. g., an enlarged reference drawing 16 on a suitable transparent material, is laid. The glass plate 13a is fixed to the mounting 27 connected with the detachable cap 29 by means of the pins 28. This cap and with it the glass plate is movable and serves to press the inserted drawing flat. The drawing 16 which may be exchanged very quickly, is illuminated by the light sources 14 (Fig. 1) or the tubular light source 30 (Fig. 2). In order to obtain a uniformly illuminated surface, a translucent diffusing means, e. g., an opaque glass disc 15, is inserted between the light sources 14 and the plate 13a. As is shown in Fig. 2, the glass plate 13a presses the drawing 16 flat against the glass plate 13. The light rays are deviated by the mirror 17 and, after having passed through a diaphragm 18, enter the objective 19. This objective 19 is preferably mounted stationarily and, on changing the magnification, need neither be replaced nor must its projection distance be changed. The combination of the image rays of the microscope and the projection system takes place in the partially permeable mirror or prism system 10, and in the eyepiece both the object image and the image of the drawing are simultaneously visible.

A movable lined plate 22 may be inserted into the eyepiece, adapted to be used for special measurement such as, e. g., for measuring angles. The latter may be read on a circular division 31 in a similar way as is the case in the well-known profile testing microscopes. The object images themselves, however, are tested with the image produced by the objective 19, i. e., not with the above-mentioned lined plate wihch is merely used for special measurements.

In order that the two images appear in the eyepiece 11 distinctly contrasted, suitable colour filters are inserted into the paths of rays of the two systems so that images of different colour occur. For this purpose complementary colours are particularly well-suited, which, when combined appear white. Into the ray path of the microscope, for instance, a red filter 20 and into the ray path of the projection device a green filter 21 is inserted. In this way the image of the drawing 16 appears red and that of the object 2 green on a clear ground, so that after the superimposition of the two images even the smallest differences are distinctly contrasted while the superposed parts appear black in the clear eyepiece field. Besides, the object image and the image of the comparison means always unequivocally differ from each other by their different colours.

The focusing is carried out by moving the plane table 1.

It is clear that the details of the apparatus may undergo various modifications with regard to the scheme illustrated without departing from the spirit of the invention. It might also be provided with several magnifying powers. Then, the objectives and the condensers would preferably be arranged on movable carriers. The plane table may be replaced by an ordinary object carrier.

What I claim is:

1. In an optical apparatus, a holder for an enlarged comparison means, means for projecting an illuminated image of said comparison means, a measuring microscope, and means for combining the image of the comparison means formed by said projecting means with the image of the object to be tested formed by said microscope to enable simultaneous viewing thereof.

2. In an optical apparatus, a holder for an enlarged drawing of the object to be tested, means for projecting an illuminated image of said drawing, a measuring microscope and means for combining the image of said drawing with the image of the object to be tested formed by said microscope to enable simultaneous viewing thereof.

3. An apparatus as claimed in claim 1, characterized by the provision of color filters for coloring the several images.

4. In an optical apparatus, a measuring microscope, a holder for an enlarged comparison means, means for projecting an illuminated image of said comparison means, said projecting means including an objective with a projection distance constant over all magnifying powers of said measuring microscope, and means for combining the image of the comparison means formed by said projecting means with the image of the object to be tested formed by said microscope to enable simultaneous viewing thereof.

5. In an optical apparatus, a measuring microscope, a holder for the image to be tested arranged adjacent said microscope, a holder for an enlarged comparison means, means for projecting an illuminated image of said comparison means, one of said holders being stationary and the other adjustable, and means for combining the image of the comparison means formed by said projecting means with the image of the object to be tested formed by said microscope to enable simultaneous viewing thereof.

KARL BUTSCHER.

REFERENCES CITED

The following references are of record in the file of this patent:

UNITED STATES PATENTS

| Number | Name | Date |
|---|---|---|
| 1,281,035 | Levy | Oct. 8, 1918 |
| 1,371,458 | Wilson | Mar. 15, 1921 |
| 2,130,710 | Alexander | Sept. 20, 1938 |

FOREIGN PATENTS

| Number | Country | Date |
|---|---|---|
| 787,803 | France | July 16, 1935 |